United States Patent
Rewatkar et al.

(10) Patent No.: US 11,863,872 B2
(45) Date of Patent: Jan. 2, 2024

(54) METHOD AND SYSTEM FOR IMPROVING A VISUAL PRESENTATION OF A USER DURING A VIDEO CONFERENCE

(71) Applicant: Avaya Management L.P., Durham, NC (US)

(72) Inventors: Vinit Rewatkar, Pune (IN); Amit Singh, Pune (IN); Apurva Vartak, Pune (IN)

(73) Assignee: Avaya Management L.P., Durham, NC (US)

( * ) Notice: Subject to any disclaimer, the term of this patent is extended or adjusted under 35 U.S.C. 154(b) by 79 days.

(21) Appl. No.: 17/115,498

(22) Filed: Dec. 8, 2020

(65) Prior Publication Data

US 2022/0182524 A1 Jun. 9, 2022

(51) Int. Cl.
*H04N 23/71* (2023.01)
*H04N 7/15* (2006.01)
*H04N 7/14* (2006.01)
*G06V 20/20* (2022.01)
*G06V 40/10* (2022.01)

(52) U.S. Cl.
CPC ............ *H04N 23/71* (2023.01); *G06V 20/20* (2022.01); *G06V 40/10* (2022.01); *H04N 7/147* (2013.01); *H04N 7/15* (2013.01)

(58) Field of Classification Search
None
See application file for complete search history.

(56) References Cited

U.S. PATENT DOCUMENTS

| | | | |
|---|---|---|---|
| 6,850,265 B1* | 2/2005 | Strubbe | H04N 7/15 348/E7.083 |
| 9,967,520 B1* | 5/2018 | Rensburg | H04L 12/1822 |
| 2002/0113862 A1* | 8/2002 | Center, Jr. | H04N 19/186 348/E7.083 |
| 2009/0027485 A1* | 1/2009 | Erhart | H04N 7/144 348/14.12 |
| 2009/0172756 A1* | 7/2009 | Wheatley | H04N 21/4788 725/106 |
| 2012/0320142 A1* | 12/2012 | Baird | H04N 7/15 348/E7.083 |
| 2015/0264313 A1* | 9/2015 | Bright-Thomas | G06V 10/40 348/14.08 |
| 2018/0241882 A1* | 8/2018 | Lee | H04N 7/147 |
| 2020/0351112 A1* | 11/2020 | Brooks | H04M 3/568 |

* cited by examiner

*Primary Examiner* — Stella L. Woo
(74) *Attorney, Agent, or Firm* — Sheridan Ross P.C.

(57) ABSTRACT

A method, system, device for improving a user's visual presentation on screen during a communication session including a video portion. The method includes an image capturing device (e.g., a camera) that acquires an image of a local participant during a video communication session, a processing unit that determines a position of the local participant on the screen/within the camera frame, and a control unit that alerts the local participant if an adjustment is necessary to obtain an optimal position, lighting, etc., wherein the optimal position comprises the user's head and shoulders being displayed predominantly on the screen.

20 Claims, 8 Drawing Sheets

METHOD AND SYSTEM FOR IMPROVING A VISUAL PRESENTATION OF A USER DURING A VIDEO CONFERENCE

COPYRIGHT NOTICE

A portion of the disclosure of this patent document contains material that is subject to copyright protection. The copyright owner has not objected to the facsimile reproduction by anyone of the patent document or the patent disclosure as it appears in the Patent and Trademark Office patent files or records, but otherwise reserves all copyright rights whatsoever.

FIELD OF THE DISCLOSURE

The present disclosure relates generally to systems and methods for video communication and particularly to improving the visually presentation of a user during a video conferencing to be more appropriate and impactful.

BACKGROUND

Interactions are increasingly becoming more virtual. For example, schools and business are increasing the use of video conferencing to connect users. Students may attend lectures virtually and employees may interact virtually via different video conferencing solutions. Additionally, with camera enabled smart phones, video conferencing is becoming more prevalent for personal use as well. During a video conferencing session, a user may share audio and video content. If the user may wish to share only audio content and disable their video, or conversely disable their audio and only share their image. In some instances when a user is sharing video content there may be elements of the visual presentation that may be improved in order to present a more optimal visual image.

Elements of visual presentation may include, but are not limited to, a user's positioning relative to an image capturing device (e.g., angle, distance, etc.), lighting, environment/background, etc. For instance, if the user's camera is titled downward, the user's face may not be visual in the video/image transmitted to the other participants in the video conferencing session. In another example, the user's image may appear poorly illuminated to the other participants. Poor illumination may have a variety of causes. For example, when a user sits directly in front of a window, if there is light coming through the window, the user may appear to be poorly illuminated. This issue may be resolved by having the user change his position so that he is no longer directly in front of the window. The user may either rotate left or right so that the window is no longer behind him. In this example, the cause of the poor illumination is somewhat dependent on the time of day. That is to say, if the same user sits in front of the same window at night, when there may be no natural/sunlight entering through the window, the user may not appear poorly illuminated. In other words, while seated in the same spot, depending on the time of day, the user may or may not be poorly illuminated.

SUMMARY

These and other needs are addressed by the various embodiments and configurations of the present disclosure. The present disclosure can provide a number of advantages depending on the particular configuration. These and other advantages will be apparent from the disclosure contained herein.

The various embodiments and configurations of the present invention aim to help users of video conferencing systems and software to present a more effective virtual presence. As virtual communications (e.g., video conferences) become an increasing feature of communication, both professionally and personally, an effective presentation also becomes more important. An effective presentation provides an initial impressions to other participants in the virtual communication session. In some embodiments, the method and system determines whether the user's camera is activated and transmitting video, if the user has disabled his camera it may not be necessary to perform the method disclosed herein. If the user's camera is on and capturing video, the method and system monitors captured video to monitor whether the user's face with the shoulder area is being captured predominately by the camera. For example, the system may include a graphics unit that continuously monitors the user's face to ensure the user's entire face is being captured by the camera. In other words, the method and system determines a user's position to ensure that the user is positioned appropriately in front of the camera. For example, a user's head and shoulders should be predominately seen in the frame of the camera. If the user is too close to or too far away from the camera, the method and system may suggest the user move further/closer away so that the user's head and shoulders are more optimally positioned.

Additionally, or alternatively, the method and system may determine a state of illumination and inform the user whether to increase or decrease the lighting to achieve a more optimal presentation. In some embodiments, the graphics unit processes the captured image/video to determine an illumination state of the video. For example, the user may be positioned in front of a window causing the user's face to appear in shadow (e.g., darker than the rest of the image), the method and/or system may alert the user and suggest the user alter her position such that the window is no longer directly behind the user (e.g., user shifts so that the window is to the left/right of the user instead of directly behind the user). In some embodiments, the alert may comprise a visual and/or audible alert. For example, a flashing window may appear on the user's screen, or a message may be sent to the user via a whisper channel (e.g., only audible to the user and not the other participants of the video conference). Additionally, or alternatively, the alert may comprise an alert sent to the user's (e.g., contact center agent) supervisor. In some embodiments, the method and systems disclosed herein use machine learning to improve the determination of the user's position. The system recognizes a user's face (and other physical elements) and may also undergo training provided by a machine learning unit. The graphics/machine learning unit will identify a user's face and/or posture (e.g., shoulders) and check using Artificial Intelligence (AI) to determine whether the user is appropriately positioned (e.g., entirely within the camera frame) and/or whether the video/image is properly illuminated.

In some embodiments, the method and/or system may be deployed in a contact center environment, and the contact center wants to ensure that its agents are positioned properly when communicated with customers. Proper positioning will provide the customer with a better impression of the contact center and the associated enterprise represented by the contact center. If the agent is not properly position (e.g., violation) the data (e.g., alert) may be transferred to a supervisor. The supervisor may perform immediate correction during the communication session. In other embodiments, the data may be stored and used for performance reviews and/or training of other agents.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

Figure 1:
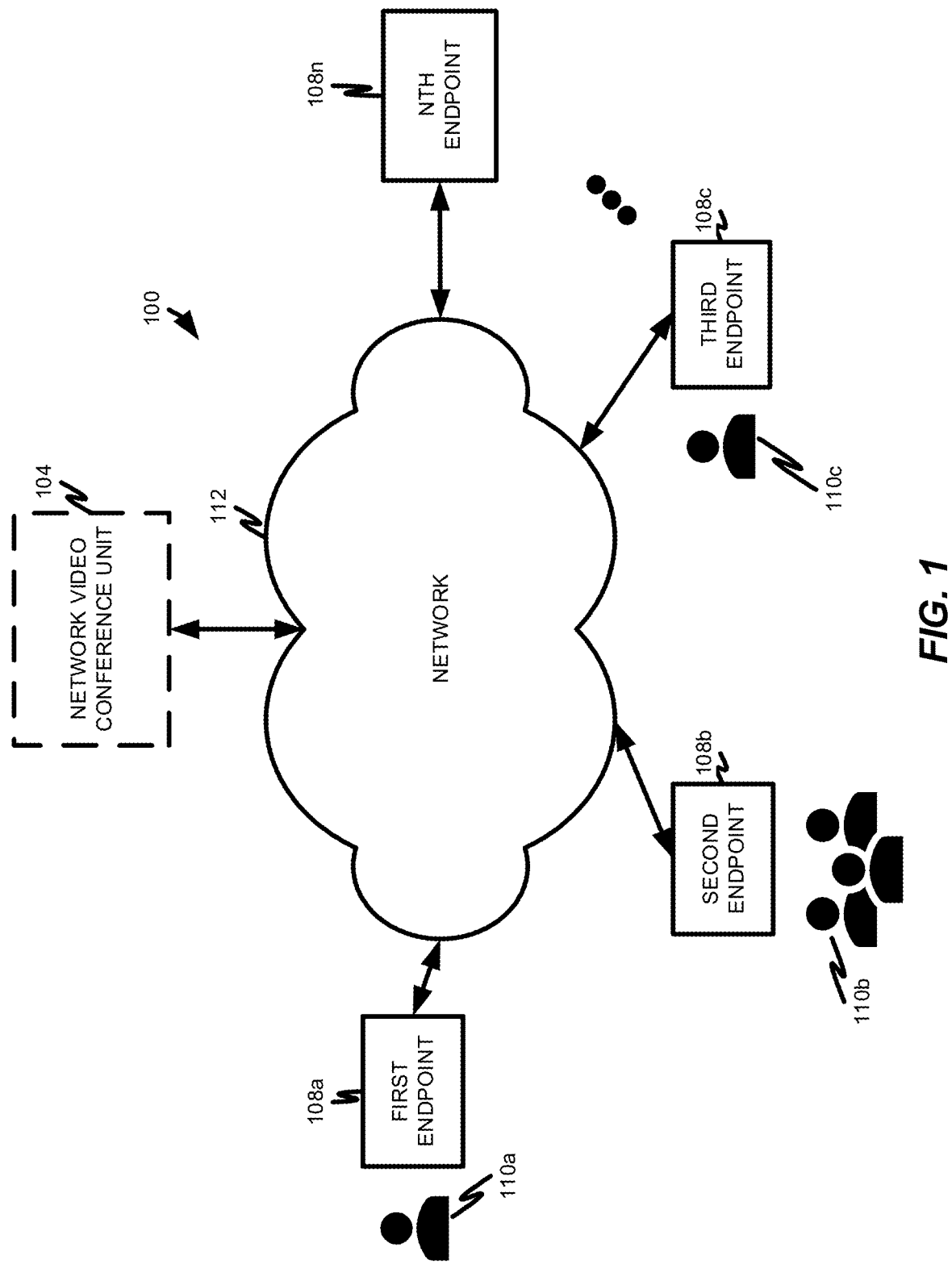
FIG. 1 depicts a system to optimize user presentation during a video conferencing session in accordance with embodiments of the present disclosure.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising an element number, without a sub element identifier when a sub element identifier exists in the figures, when used in the plural, is intended to reference any two or more elements with a like element number. When such a reference is made in the singular form, it is intended to reference one of the elements with the like element number without limitation to a specific one of the elements. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

The method and system disclosed herein assist a user project his or her visual presence more effectively during a video conferencing session. The ability to present an effective image during a virtual communication session is becoming increasingly more important as virtual communication becomes increasingly more prevalent. The presence (e.g., camera angle, user positioning, the angel of the user's face, lighting, etc.) a user presents during a video conference may influence other participants' impression of the user and/or the effectiveness of the virtual communication session. While the sending and receiving of audio may be optionally utilized and incorporated into the video conference content, audio-based communications are outside the scope of the embodiments provided herein.

For example, if the user face is not completely in the camera frame this could be distracting and/or ineffective. In another example, a user's presence may be more effective if he moves closer to the camera (e.g., image is more centered in the camera frame). In another example, lighting may affect the user's presence in a video camera. If the lighting is too bright behind the user, the user's face may appear darkened. Some other presence issues may include pixilation caused by a poor connection. In yet another example, the method/system may detect that an agent's attention is not directed to the camera and/or caller, the agent's inattention may be reported to the agent's supervisor. In some embodiments the user is alerted during a test (e.g., before the user begins to share her video). Additionally, or alternatively, the method/system may continue to monitor the user's video during the duration of the communication session and provides real-time alerts to the user to adjust his positioning, lighting, etc. to achieve a more optimal presentation.

If the method/system detects the user's positioning, lighting, etc. could be adjusted to provide a more optimal presentation, the user is notified of the issues and/or options to make adjustments (e.g., rotate position, increase/decrease lighting, move closer to/further from camera, etc.). In some embodiments, if available, the system may make automatic adjustments to the user's device (e.g., camera) to improve positioning, lighting, etc.

The notifications are provided in real-time during the communication session. The alerts/notification may be further configured based on a user's preferences. For example, the user may select the type (e.g., visual, audible, etc.) and positioning of the alerts. In other examples, the user may completely disable A user may also determine how often the system determines the user's position. For example, the user may only want to have the positioning determination during the initial test and/or for the duration of the communication session.

In some embodiments, the present disclose may be incorporated into an add-on that may be installed to a video conferencing application.

A conferencing system 100 of FIG. 1 generally includes an optional network video conference unit 104 and first, second, third, . . . nth endpoints 108a-n, interconnected by a network 112. A user 110a is associated with the first endpoint 108a; users 110b are connected to a video conference via the second endpoint 108b; and a user 110c is associated with the third endpoint 108c. While the first, second, and third endpoints 108a,b,c are depicted, it is to be appreciated that more endpoints can be present and participating in the video conference. The conferencing system 100 can be a personal video conferencing system between two users communicating one-on-one or point-to-point (in which case no MCU is required), a group video conferencing system among three or more people, a mobile video conferencing system involving one or more mobile endpoints and can be a software only solution, hardware only solution, or combination of software and hardware solutions.

An optional network video conference unit 104 can be any network multipoint conferencing unit ("MCU") or video conferencing server ("VCS"). During a multipoint conference session, the MCU can manage multiple endpoints at once, coordinate the video data processing of the multiple endpoints, and forward the flow of media streams among the multiple endpoints. The MCU can conduct group video conferences under the principle of mixing media streams, e.g., mixing and re-encoding participants' video conferencing streams in real time. For example, the MCU can create a picture-in-picture effect. The MCU in most applications includes a multipoint controller ("MC") and optionally one or more multipoint processors ("MPs"). The MCs can coordinate media stream processing parameters between endpoints and typically support the H.245 protocol. The MPs can process, mix and switch multimedia streams.

In contrast, a VCS often implements a multiplexing pattern of the data streams, which implies no transcoding. The VCS typically redirects the media streams of the video conference participants. The compression/decompression and media stream mixing functions are generally performed in the endpoint devices.

The network video conference unit 104 can service any conference topology, including a centralized conference, decentralized conference, or hybrid conference topology. Exemplary video conference units that can be modified as set forth herein include the ELITE 6000™, 6110™, 6120™, 5000™, 5105™, and 5110™ products of Avaya, Inc.

The first, second, third, . . . nth endpoints 108a-n can be any suitable devices for providing a user interface for a voice or video conference. Some of the endpoints can be capable of hosting the voice portion of the conference only or a part of the video conference (e.g., only display images of remote participants, but not transmit an image of a local participant; or only transmit an image of a local participant, but not display images of remote participants). Alternatively, an endpoint (e.g., an of the first, second, third, . . . nth endpoints 108a-n) may be able to display images of remote participants and simultaneously transmit an image of the local participant. The first, second, and third endpoints 108a-c optionally display locally to the local participant images of remote participants. Examples of suitable devices include a smart phone, cellular phone, tablet computer, phablet, laptop, personal computer, and purpose-built devices, such as the SCOPIA XT EXECUTIVE 240™, XT ENDPOINT™, XT1700™, XT4200™, XT4300™, XT5000™, XT embedded Server™, XT7000, and XT Endpoint™ with embedded server products by Avaya, Inc. that can be modified as set forth herein. In accordance with at least some embodiments of the present disclosure, the endpoint devices 108a-n may comprise any type of known communication equipment or collection of communication equipment. In general, each endpoint 108a-n may be adapted to support video, audio, text, and/or data communications with other endpoints 108a-n. The type of medium used by the endpoint 108a-n to communicate with other endpoints 108a-n may depend upon the communication applications available on the endpoint 108.

The optional network video conference unit 104 and first, second, third, . . . nth endpoints 108a-n are connected by the network 112. The network 112 can be a local area network ("LAN"), a wide area network ("WAN"), a wireless network, a cable network, a telephone network, the Internet, and/or various other suitable networks in which a video conferencing system can be implemented.

Figure 2:
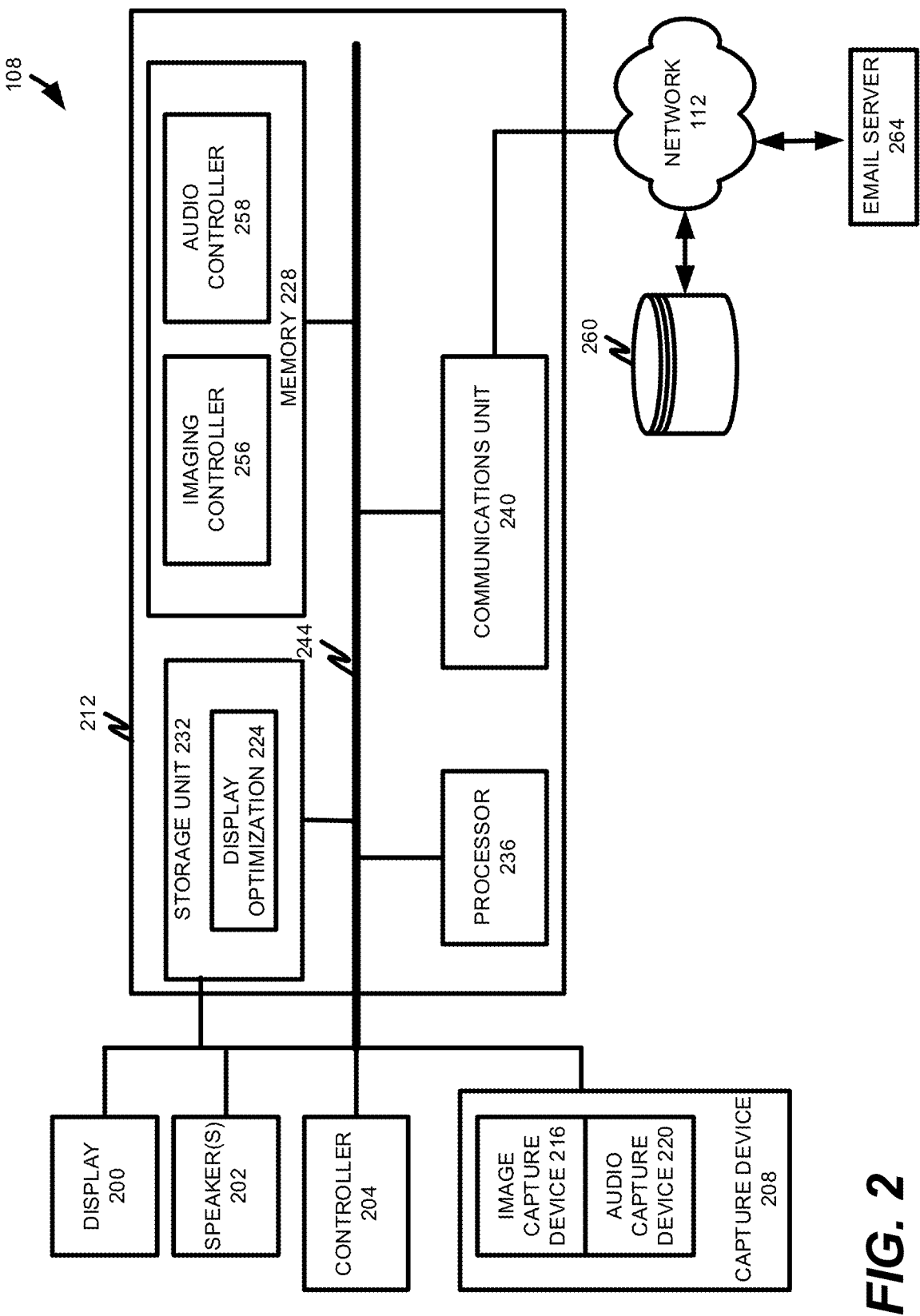
FIG. 2 depicts an endpoint in accordance with embodiments of the present disclosure.

With reference to FIG. 2, an exemplary endpoint is depicted (e.g., similar to or the same as any one of the first, second, third, . . . nth endpoints 108a-n). The exemplary endpoint 108 comprises a display device 200, a controller 204, a capture device 208, and a control unit 212.

The display device 200 can be any appropriate display or screen suitable to display an image stream received from the control unit 212. The display device 200 may display an image stream received at the control unit 212 from one of the remote video conferencing endpoints over the communications network 112. Alternatively, and/or additionally, the image stream received from the image capture device 208 may be displayed by the display device 200 and/or processed by the control unit 212 before transmission to the display device 200.

The controller 204 can be any type of input devices, such as a keyboard, a pointing device (e.g. mouse, trackball, pointing stick, etc.), a remote-control unit or a touchscreen device enabling a participant of the video conferencing room to interact with the control unit 212.

The capture device 208 can include an image capturing device 216, such as one or more still or video cameras capable of capturing 2-dimensional or 3-dimensional image information, and an audio capturing device 220, such as one or more microphones. The image capturing device 216 captures and provides image streams to the control unit 212. The audio capturing device 220 can comprise an array of microphones to capture and provide the audio streams to the control unit 212.

The control unit 212 generally comprises a memory 228, a storage unit 232, a processor 236 and a communications unit 240. The control unit 212 can communicate (e.g., exchange audio and video information and/or any additional data), over the communications network 112, with the other video conferencing endpoints and the network video conference unit 104, access an enterprise database 260 comprising subscriber information, and/or interact with an enterprise email server 264 comprising subscriber email correspondence. The display device 200 can provide a command and control interface for the user (e.g., a user 110a).

The memory 228 can be any computer readable medium, such as a random-access memory (RAM) or other dynamic storage device (e.g. dynamic RAM, static RAM, synchronous RAM, etc.) coupled to a bus 244 for storing information and instructions to be executed by the processor 236. Additionally, the memory 228 may be used to store temporary variables and/or other intermediate information during the execution of instructions by processor 236. It will be appreciated by those skilled in the art that the memory 228 may be a single memory or split into a plurality of memories. For example, a further memory may be provided such as a read only memory (ROM) or any other static storage (e.g. programmable ROM, erasable programmable ROM, and electrically erasable programmable ROM, etc.) coupled to the bus for storing static information and instructions for the processor 236. Included in the memory 228 of the control unit 212 are an imaging controller 256 and an audio controller 258.

The storage unit 232 can be a further computer readable medium, such as a magnetic hard disk, or a removable media drive (e.g. floppy disc drive, read-only compact disc drive, read/write compact disc drive, compact disc jukebox, tape drive, and removable magneto-optical drive), etc. coupled to the bus for storing other information and/or instructions.

The processor 236 can process any command received from a video conferencing user, triggered by the video conferencing endpoint 108 or received from the communications network 112 (e.g., from the network video conference unit 104 and/or from another video conferencing endpoint 108). In response to a received command, the processor 236 can retrieve and execute the relevant set(s) of instructions from the memory 228 and/or the storage unit 232. Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM1926EJ-S™ processors, other industry-equivalent processors, and may perform computational functions using any known or future-developed standard, instruction set, libraries, and/or architecture. Those skilled in the art will appreciate that the present disclosure is not limited to this single processor arrangement but that one or more processors in a multi-processor arrangement may be employed to execute the set(s) of instructions retrieved from one of the memories.

Finally, the communications unit 240 is generally a communication interface providing a two-way communication coupling between the video conferencing endpoint 108 and the communications network 112. The communications unit 240 can receive any type of data information from the different devices of the video conferencing endpoint 108 such as the display device 200, the controller 204, and the capture device 208 and pass the data information to the processor 236 for further processing and/or to other video conferencing endpoints of the video conferencing system 100 over the communications network 112. Also, the communications unit 240 can receive any additional data information received by an additional or alternative device present in the video conferencing endpoint 108. The communication unit 240 can exchange (e.g. transmit and receive) any suitable type of data information with a plurality of devices coupled to the control unit 212 and exchange information with remote video conferencing endpoints 108 or the network video conference unit 104 of the video conferencing system 100 over the communications network 112.

The display optimization unit 224 automatically determines a position of a local user/participant to determine whether the user's positioning, lighting, etc. should be adjusted. For example, the image capture device 216 captures an image of a user (e.g., users 110a-c), the display optimization unit 224 can alert a user 110a-c that the user's position should be adjusted and/or the brightness or intensity and/or color of the lighting should be adjusted to emphasize. In addition to users 110a-c, the display optimization unit 224 may monitor the positioning/lighting in the presentation of a resource (e.g., a whiteboard). Suggestions regarding adjustments may be made to ensure a user's video complies with business requirements, user experience metrics, etc.

To illustrate, levels of ambient light, particularly in a meeting area with windows, can change from meeting to meeting due to variations in sunlight. A given participant can appear differently from meeting to meeting due to the lighting variations. The display optimization unit 224 may make suggestions regarding adjusting lighting settings to provide a substantially constant appearance of the participant not only during a meeting but also from meeting to meeting. In some example, it may be suggested to a user to not sit directly in front of a window. In another example, if there is no natural light, it may be suggested to the user to turn on a lighting device (e.g., a lamp).

The display optimization unit 224 can acquire the facial images of each local participant in the captured image using face detection techniques, acquire other object images in the captured image (e.g., a whiteboard, table, chair, and the like) using digital processing techniques, determine an identity of each acquired facial image by face recognition techniques using an identified biometric information of the participant, determine a spatial location of each participant relative to a local image capture device 216 and to one or more other participants such as by motion detection, determine an active speaker using speaker localization and a microphone array, determine a point of focus of one or more participants in the room by gaze detection, and the like. For example, when there are multiple users using a shared endpoint (e.g., the users 110b and the second endpoint 108b). The display optimization unit 224, using face detection techniques, microphone array analysis, or motion detection, can detect a participant entering or leaving the monitored communication session area, e.g., room.

The display optimization unit 224 commonly provides the determined information to the imaging controller 256, which can determine, based on rules and user input, how to adjust the user's position, lighting, etc. to optimize the user's presentation provided to the other remote participant endpoints at any point in time during the communication session, or to define a set of optimal views for the video conferencing session identified by image processing and contextual analysis.

In some embodiments, the imaging controller 256, is able to identify and adjust the capture device 216 (e.g., adjust the pan, tilt, or zoom of a camera) to a selected optimal view of the meeting area and/or participant. Additionally, or alternatively, the display optimization unit 224, may provide one or more suggestions of adjustments to be made during the communication session. By way of illustration, an optimal view could include having all participants in frame, in focus and centralized in the captured image, and having substantially the least background image information in frame. Other optimal views include whiteboard focus in which the whiteboard is in focus and centralized (e.g., from the view of the camera) in the captured image. For example, lighting suggestions may be made to ensure the whiteboard is properly illumination to be seen by the other participants of the video conference.

Figure 3:
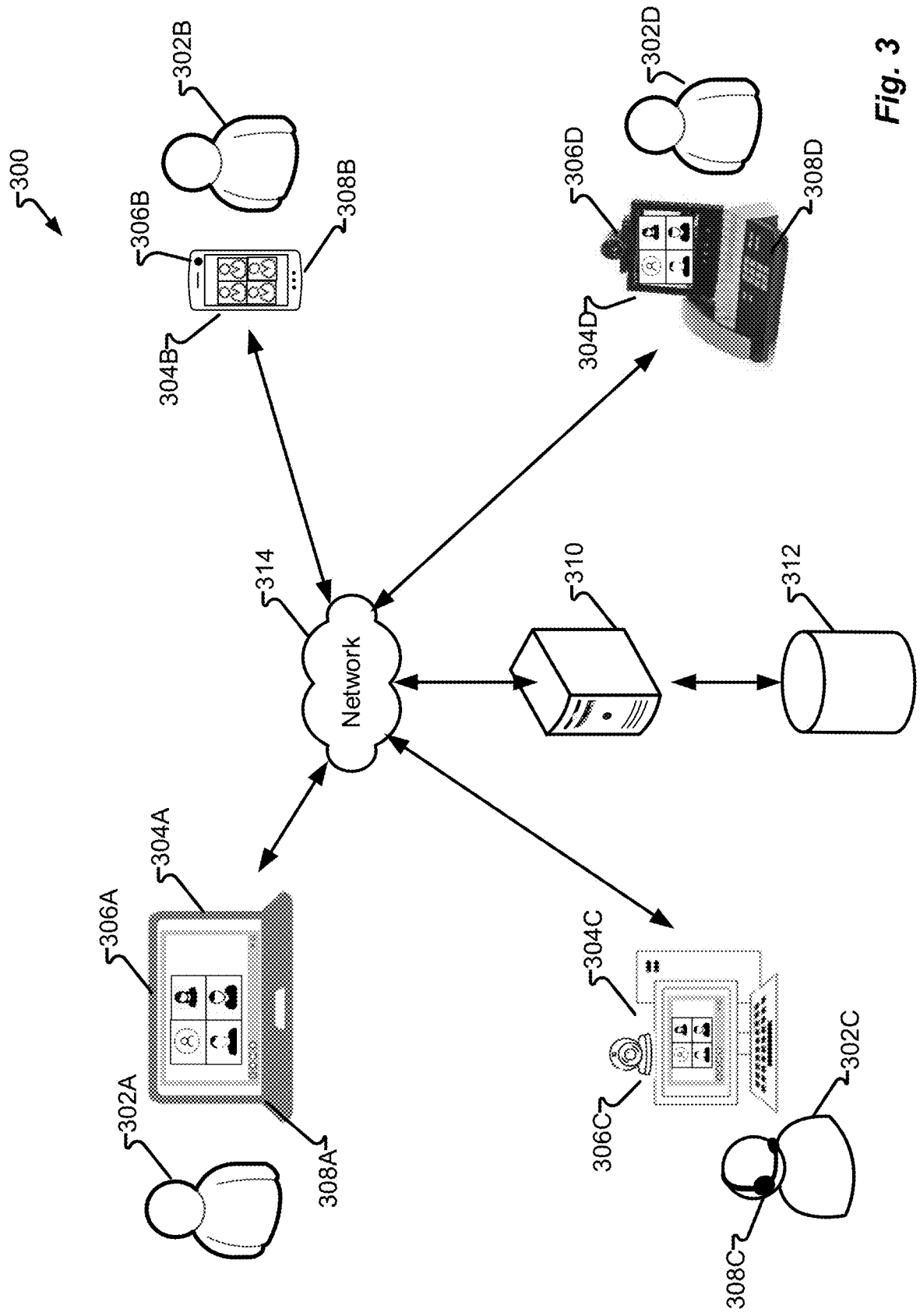
FIG. 3 depicts a system to optimize user presentation during a video conferencing session in accordance with embodiments of the present disclosure.

With reference now to FIG. 3, a communication system 300 is discussed in accordance with at least some embodiments of the present disclosure. The communication system 300 may be a distributed system and, in some embodiments, comprises a communication network 314 connecting one or more communication devices 308A-D to a video conferencing server 310.

In accordance with at least some embodiments of the present disclosure, the communication network 314 may comprise any type of known communication medium or collection of communication media and may use any type of protocols to transport electronic messages between endpoints. The communication network 314 may include wired and/or wireless communication technologies. The Internet is an example of the communication network 314 that constitutes an Internet Protocol (IP) network consisting of many computers, computing networks, and other communication devices located all over the world, which are connected through many telephone systems and other means. Other examples of the communication network 314 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 314 need not be limited to any one network type and instead may be comprised of a number of different networks and/or network types. Moreover, the communication network 314 may comprise a number of different communication media, such as coaxial cable, copper cable/wire, fiber-optic cable, antennas for transmitting/receiving wireless messages, and combinations thereof.

In one embodiment, a video conference is established and maintained between one or more participants 302A-D (e.g., participants 102A-D) wherein audio, video, documents, co-browsing, and/or other media, is broadcast to each of the participants 302A-D. The audio portion of the conference may comprise audio in the form of speech provided by one or more of participants 302A-D. In addition to the audio portion, each participant may contribute a video portion, comprising video provided by one or more of participants 302A-D. It should be appreciated that the number of participants illustrated by the participants 302A-D is non-limiting and may comprise any number of two or more participants, wherein at least one of the participants 302A-D provides or attempts to provide a portion of the audio/video content of the conference. As will be discussed more completely with respect to the embodiments that follow, a respective user's positioning, lighting, etc. may require adjustment to achieve an optimal presentation.

The participants 302A-D, or at least a non-zero subset of the participants 302A-D, receive the video conference as broadcast by a video conferencing server 310 via the network 314. The video conferencing server 310 may have or utilize a data storage 312 as a non-transitory repository of data accessible to at least one microprocessor (or, more simply, "processor") of the server 310. The server 310 may be a stand-alone component or co-embodied with other components, such as to manage communications, participant attendance, timing, receiving/contributing permissions, floor control, and/or other administrative and/or connectivity features. For example, audio and video transmitted by the participant 302A, via an endpoint 304A (including, for example, a camera 306A and a microphone 308A), is broadcast back to each endpoint 304A-D participating in the video conference. Optionally, audio and/video provided by one endpoint (e.g., the endpoint 304A) may be excluded from the broadcast provided to the providing endpoint.

The video conferencing server 310 may comprise or access, telephony or other communication equipment (e.g., switches, hubs, routers, etc.) in order to facilitate broadcasting the video conference and receiving portions of the conference content from any of the participants 302A-D providing conference content. In another embodiment, the server 310 and/or the data storage 312 may be embodied as one of endpoint 304.

The participants 302A-D may provide conference content via a respective endpoint 304A-D that converts encoded audio and video signals broadcasts via the network 314 from the server 310 and vice versa. Optionally, one or more of the endpoints 304A-D may similarly present text messages, documents, co-browsing signals, etc. to and/or from the server 310. Each of the endpoints 304A-D configured to contribute audio and video to the video conference comprises and/or utilizes a microphone 308 to capture mechanical wave energy (e.g., sound), and a camera 306 to capture images, such as from an associated participant 302 and converts the sound and images into electrical signals which may be further converted to data packets for transport via the network 314.

Examples of the endpoint 304, the associated microphone 308, and the associated camera 306 include, but are not limited to, endpoints 304A through 304D. The endpoints 304 may be embodied as, for example, a laptop 304A with an attached microphone 308A, and attached camera 306A; a smart phone 304B that includes a camera 306B, and a speaker/microphone 308B; a personal computer 304C with a headset/microphone 308C connected wired or wirelessly, and a camera 306C connected wired or wirelessly; and a video phone 304D that includes a camera 306D, and speaker/microphone 308D. The endpoints 304A-D are associated with participants 302A-D, respectively. It should be appreciated by those of ordinary skill in the art that other microphones may be utilized as the microphone 308, such as a handset of a telephone, which may be a wired (analog or digital) or wireless (e.g., cellular, WIFI, two-way radio, etc.) endpoint to the network 314. Similarly, the endpoint 304 may be embodied as any telecommunications device operable to receive a video conference broadcast from the server 310 via the network 314 and present the video conference to one or more of the participants 302A-D and optionally provide an audio and video portion for incorporation by the server 310 into the conference content.

As more and more users across the world adopt a remote working culture, conferencing, and particularly video conferencing is becoming increasingly more common. During these video conferences poorly illuminated image and or poor user position may cause distractions. A much richer experience may be provided to the conference participants if the video conference system was able intelligently detect that a user's position, lighting, etc. and make suggestions regarding adjustments to the user's position, lighting, etc. to provide a more optimal presentation. In some embodiments, where available, after intelligently detecting that the user's position, lighting, etc. requires adjustment, the user's device may automatically and intelligently take action without requiring manual intervention from the local user. In some example, the system may utilize technologies, such as Artificial Intelligence, especially Deep Learning, Image Recognition and Natural Language Processing to intelligently detect that the user's position, lighting, etc. requires adjustment.

In some embodiments, the AI Driven Facial Movement Recognition and Analysis module might employ one or more AI Vision libraries which will be trained with numerous samples of the human facial structure and facial characteristics in order for the module to recognize different parts of any newly provided facial image and identify the movements of the different facial portions in that image. An artificial neural network may be used to achieve this. These components may also be services hosted in the cloud as provided by 3rd party cloud service providers.

Each capture device (e.g., cameras 306A-D) associated with each of communication devices 304A-D connecting users 302A-D to a video conference, detects and monitors the faces of respective users 302A-D. The detection may be performed at the beginning of the video conferencing communication session, and the monitoring may be performing during the video conferencing communication session. For example, the camera 306A associated with the device 304A may be angled downward such that the participant 302A may not be optimally position within the camera frame. Conversely, the camera 306A may be angled upward and the participant 302A may not be in view of the camera. Suggestions regarding the pan, tilt, and zoom of the camera 306A to produce an optimal view, based on the location of the participant 302A Continuing the example, participant 302A may move during the video conference session (e.g., move to a whiteboard and is no longer in the camera frame). The display optimization unit 224 alerts the user that adjustment is necessary. For example, a captured facial image or facial feature of a participant is compared against a target face color or hue, to determine if the lighting should be adjusted to illuminate the participant's face in the video image. This can be done using image processing by identifying a user's face or facial features using face detection, varying the lighting element(s) properties (e.g., on/off state, color, intensity, brightness, etc.) as well as exposure of the image capture device until one or more of the detected face images is approximately equal to a target mean color for the participant face or facial feature (e.g., skin tone).

This can be combined with face-tracking based auto exposure control (which tracks the face region and uses the intensity of the face region to control the camera exposure) to provide even better results. In other embodiments, photosensors are placed at selected spatial locations around the meeting area. Photosensors detect the presence and determine the magnitude of visible light, infrared transmission, and/or ultraviolet energy. As lighting elements are activated and deactivated and adjusted, the photosensors can detect and quantify lighting effects at the different selected spatial locations.

The above steps can be performed once during set up of the endpoint, at the beginning of each conference call to take ambient (e.g., daylight) lighting levels into account, and/or at various points during the conference call to take ambient (e.g., daylight) lighting level variations into account.

In some embodiments, image processing is performed substantially in real-time with image capture, to determine and alter positioning, lighting effects, etc. to realize preferred image properties of one or more participants.

Figure 4:
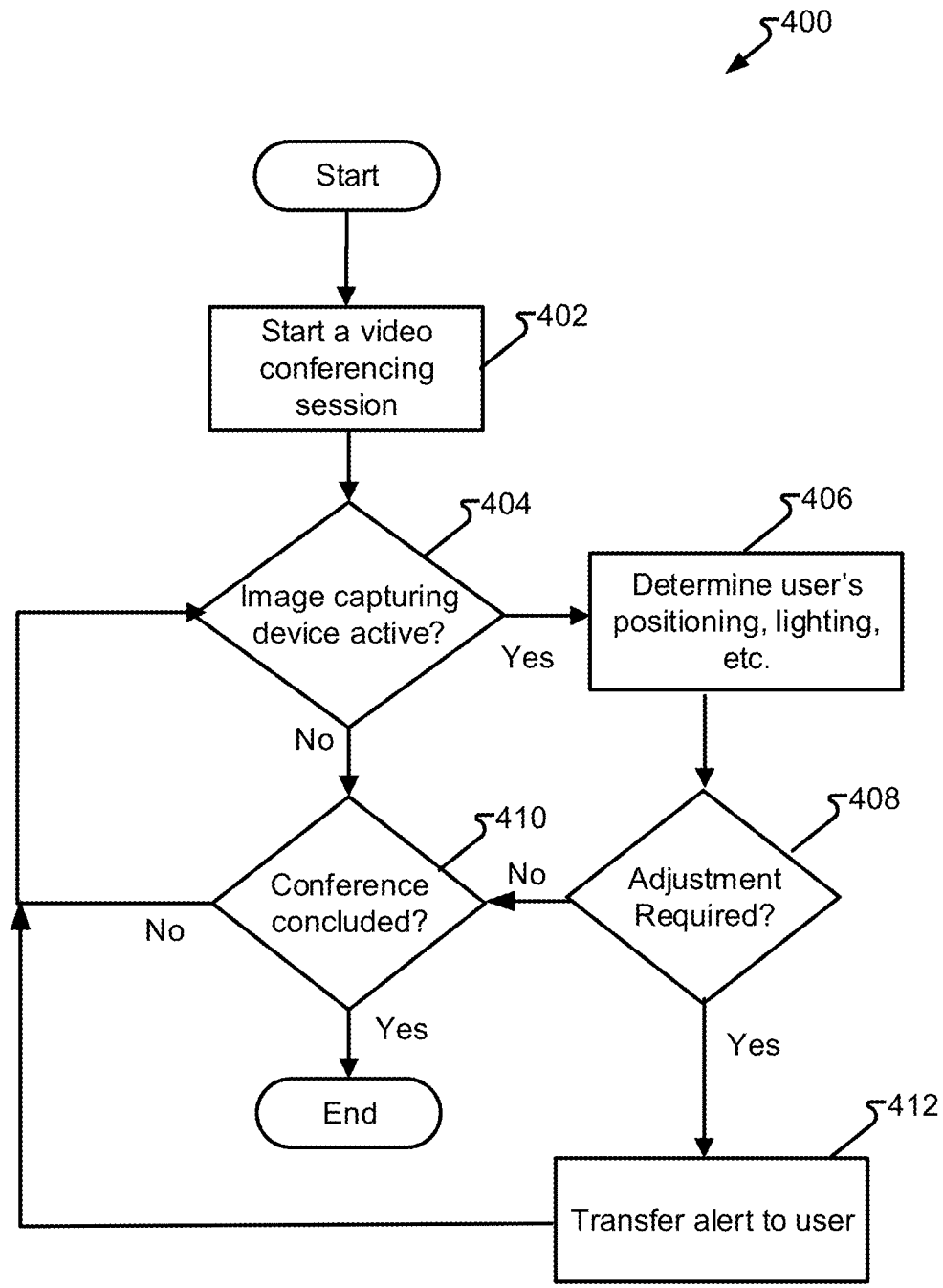
FIG. 4 depicts a process to optimize user presentation during a video conferencing session in accordance with embodiments of the present disclosure.

FIG. 4 depicts a process 400 in accordance with embodiments of the present disclosure. The process 400 may be embodied as an algorithm encoded as machine-readable instructions that, when read by a processor, such as a processor of the endpoints 108a-n and communication devices 304A-D, cause the processor to execute the steps of the algorithm. In one embodiment, the process 400 determines that video image being transmitted from a particular endpoint 108 or 304 engaged in a video conference requires adjustment for optimal visually presentation of a respective user.

In one embodiment, the process 400 starts with commencement of a video conferencing session (Step 402). Once the video conferencing session begins, each participant via an associated communication device receives and transmits conference content (e.g., an audio and a video portion). The conference content may be broadcast to participants 110 and 302, such as by the network video conference unit 104 and video conferencing server 310 for presentation to an associated participant. Broadcasting conference content may be performed continuously, while other steps of the process 400 are executed, until the conference is concluded.

In Step 404 the system (e.g., endpoints 108 and 304 and/or systems 104 and 310) determines whether an imaging is active (e.g., transmitting an image/video). If no, then the system determines whether the video conferencing session has ended (Step 410). If the video conferencing session has ended (Yes), the process 400 ends. If the image capturing device is active (Yes), the system determines positioning, lighting, etc. information (Step 406). For example, the system processes the image/video transmitted by the image capture device to determine the positioning, lighting, information. In the next step, the system determines whether an adjustment is required (Step 408). If no adjustment is required (No), then the system determines whether the video conferencing session has ended (Step 410). If the video conferencing session has ended (Yes), the process 400 ends.

If adjustment is required (Yes), an alert is transferred to the associated device to notify the user of the suggested adjustments (Step 412). In some examples, the alert comprises a visual or audio notification. For example, a visual alert may comprise flashing a text notification. In other examples, the visual alert may comprise appearance of an icon indicating the alert/message and when the user clicks on the icon a window opens with recommendations/suggestions of how to optimize the user's visual presentation (e.g., position, lighting, etc.). In some examples, the alert may comprise and audio alert or a visual alert coupled with an audio alert. In some embodiments, the alert is transferred to the supervisor of the user/participant, such as when the user is a contact center agent and the video conferencing session comprises a contact center contact. If available, the system may send instructions to the associated device to make adjustments to achieve a more optimal visual presentation.

Improving the visual presentation of a user during a video conference will be discussed more completely with respect to FIGS. 5-7

Figure 5:
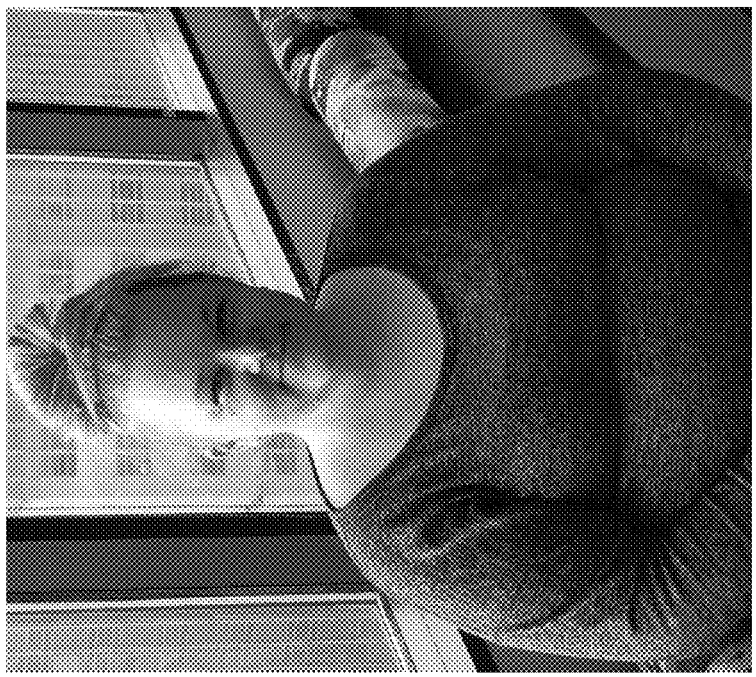
FIG. 5 depicts an example of lighting of an image during a video conferencing session in accordance with embodiments of the present disclosure.
Figure 5:
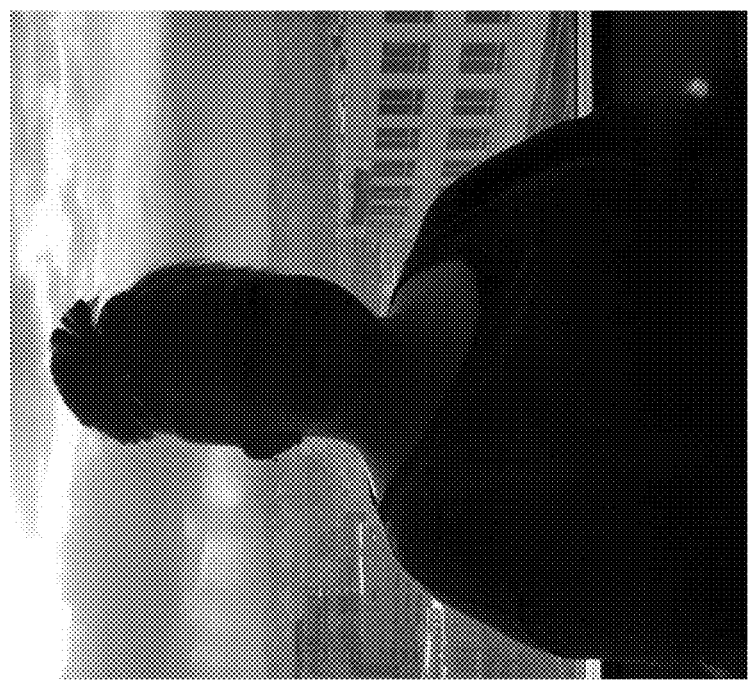

FIG. 5 depicts an example illustrating a lighting adjustment to improve a user's visual presentation in accordance with the present disclosure. As can be seen from the left image, the user's face is in shadow, compared to the image on the right when the user's face is well lit. In the image on the left, the user is seated directly in front of a window in which the natural light causes the background to be brighter than the user's face. In this example, the user's visual presentation may be improved by simply rotating so that the window is no longer directly behind the user. In the image on the right the user has rotated so that the window is on the user's left inside of behind the user.

Figure 6:
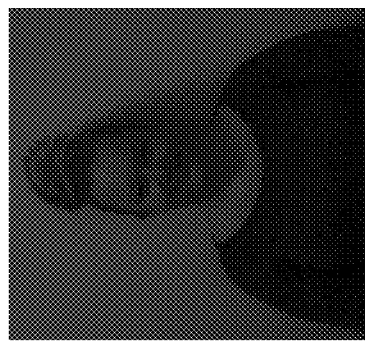
FIG. 6 depicts common lighting issues experienced during a video conferencing session in accordance with embodiments of the present disclosure.
Figure 6:
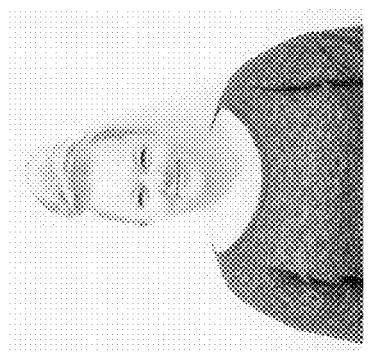
Figure 6:
Figure 6:

FIG. 6 depicts a variety of lighting issues that may affect the visual presentation of a user during a video conference. Lighting issues such as backlit, harsh shadows, overblown, and underlit may be corrected in order to improve the visual presentation of a user during a video conference.

Figure 7:
FIG. 7 depicts framing issues experienced during a video conferencing session in accordance with embodiments of the present disclosure.
Figure 7:
Figure 7:

FIG. 7 depicts different examples of framing, which is part of the visual presentation of a user during a video conference. In the image on the left, the user is too far away from the camera. In the image on the right the user is too close to the camera and the camera may be at a bad angle. In the middle image, the user's face and shoulders are predominately in the frame, which presents an optimal image to the other participants of the video conference.

Meeting types can be used to provide default conference and viewing and/or lighting parameters for meeting venues and meeting organizers or hosts. In other words, different rule sets can apply to different types of meetings (e.g., business, personal, etc.). Exemplary types of meetings are participant-only meetings with no whiteboard or presentation material and no speaker restrictions, meetings with only one designated speaker, meetings with a whiteboard in use, meetings with a presentation, etc.

The video conference system running on the server 310 may intelligently determine that the participant 302A is speaking with his video off, and may ask the user whether he wishes to activate the camera associated with his communication device. In one embodiment, the activating the camera may comprise energizing a circuit or logic of the endpoint 108 to notify the participant 110 that the video is not shared and/or prompt the participant 110 to manually activate the camera associated with the endpoint 108. For example, the endpoint 108 may play a generated or recorded message or tone and/or provide a visual prompt on a display associated with the endpoint 108 (e.g., "You are on not optimally positioned.").

The conference server may also use a confidence level or threshold in making the determinations about whether a participant is optimally positioned. In order to achieve multiple levels of confidence the system can make use of NLP, video analysis, and audio analysis. When the conclusion from the NLP, video, and audio analysis all match, the confidence level may be high; when any two match, the confidence level may be medium; and if none of the three match, or only one can be determined, the confidence level may be low.

Figure 8:
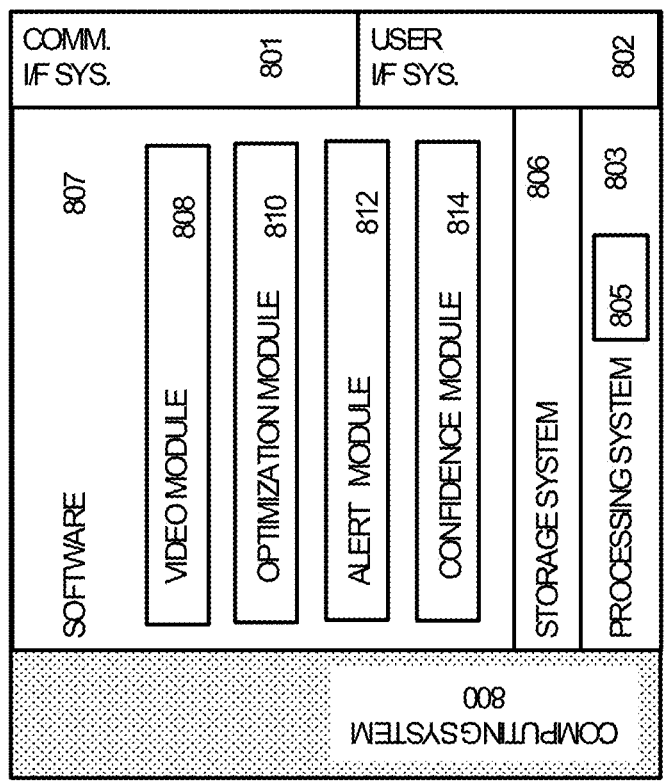
FIG. 8 depicts a computing system to optimize user presentation during a video conferencing session in accordance with embodiments of the present disclosure.

FIG. 8 depicts a communication device 800 in accordance with embodiments of the present disclosure. The communication device 800 intelligently processing a video portion of video conferencing session to determine whether user positioning, lighting, etc. is optimal. Similar computing systems may be included in endpoints 108a-n and communication devices 304A-D, in whole or in part, described herein used prompt a participant to adjusting his/her positioning, lighting, etc. to provide an optimal presentation during a video conferencing session.

A computing system 800 is representative of any computing system or systems with which the various operational architectures, processes, scenarios, and sequences disclosed herein for analyzing at least the video portion of a video conference to determine whether adjustment to a user's position, lighting, etc. is necessary, comprising various components and connections to other components and/or systems.

The computing system 800 is an example of the endpoints 102a-n and communication devices 304A-D, although other examples may exist. The computing system 800 comprises a communication interface 801, a user interface module 802, and a processing system 803. The processing system 803 is linked to the communication interface 801 and user interface module 802. The processing system 803 includes a microprocessor and/or processing circuitry 805 and a storage system 806 that stores operating software 807. The computing system 800 may include other well-known components such as a battery and enclosure that are not shown for clarity. The computing system 800 may comprise a server, a user device, a desktop computer, a laptop computer, a tablet computing device, or some other user communication apparatus.

The communication interface 801 comprises components that communicate over communication links, such as network cards, ports, radio frequency (RF), processing circuitry and software, or some other communication devices. The communication interface 801 may be configured to communicate over metallic, wireless, or optical links. The communication interface 801 may be configured to use Time Division Multiplex (TDM), Internet Protocol (IP), Ethernet, optical networking, wireless protocols, communication signaling, or some other communication format—including combinations thereof. In some implementations, the communication interface 801 is configured to communicate with other end user devices, wherein the communication interface 801 is used to transfer and receive voice and video communications for the devices. Further, the communication interface 801 may interface with a webservice, wherein the service may comprise a video conferencing service that can be accessed via a website.

The user interface module 802 comprises components that interact with a user to present media and/information (e.g., alerts), receive events coming from a participant endpoint application, and also allow a user to configure settings of the display optimization. The user interface module 802 may include a speaker, microphone, buttons, lights, display screen, touch screen, touch pad, scroll wheel, communication port, or some other user input/output apparatus—including combinations thereof. The user interface module 802 may be omitted in some examples.

The processing circuitry 805 may be embodied as a single electronic microprocessor or multiprocessor device (e.g., multicore) having therein components such as control unit(s), input/output unit(s), arithmetic logic unit(s), register(s), primary memory, and/or other components that access information (e.g., data, instructions, etc.), such as received via a bus, executes instructions, and outputs data, again such as via the bus. In other embodiments, the processing circuitry 805 may comprise a shared processing device that may be utilized by other processes and/or process owners, such as in a processing array or distributed processing system (e.g., "cloud," farm, etc.). It should be appreciated that the processing circuitry 805 is a non-transitory computing device (e.g., electronic machine comprising circuitry and connections to communicate with other components and devices). The processing circuitry 805 may operate a virtual processor, such as to process machine instructions not native to the processor (e.g., translate the Intel® 9xx chipset code to emulate a different processor's chipset or a non-native operating system, such as a VAX operating system on a Mac), however, such virtual processors are applications executed by the underlying processor and the hardware and other circuitry thereof.

The processing circuitry 805 comprises a microprocessor and other circuitry that retrieves and executes operating software 807 from the storage system 806. The storage system 806 may include volatile and nonvolatile, removable and non-removable media implemented in any method or technology for storage of information, such as computer readable instructions, data structures, program modules, or other data. The storage system 806 may be implemented as a single storage device, but may also be implemented across multiple storage devices or sub-systems. The storage system 806 may comprise additional elements, such as a controller to read the operating software 807. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

The processing circuitry 805 is typically mounted on a circuit board that may also hold the storage system 806 and portions of the communication interface 801 and the user interface module 802. The operating software 807 comprises computer programs, firmware, or some other form of machine-readable program instructions. The operating software 807 includes a video module 808, an optimization module 810, an alert module 812, and a confidence module 814, although any number of software modules within the application may provide the same operation. The operating software 807 may further include an operating system, utilities, drivers, network interfaces, applications, or some other type of software. When executed by the processing circuitry 805, the operating software 807 directs the processing system 803 to operate the communication device 800 as described herein.

In at least one implementation, the video module 808, when read and executed by the processing system 803, directs the processing system 803 to process at least a video portion of a video conference to intelligently determine whether the visual presentation of a user is optimal. In some examples, the video module comprises an Artificial Intelligence Driven Facial Movement Recognition and Analysis module. The Optimization module 810 when read and executed by the processing system 803, directs the processing system 803 to determine how the user's presentation may be adjusted to improve the visual presentation of the user during the video conference. The alert module 812, when read and executed by the processing system 803, directs the processing system 803 to transfer an alert to the user regarding the user's visual presentation during the video conference. The confidence module 814, when read and executed by the processing system 803, directs the processing system 803 to determine a confidence score for a visual presentation of the user.

It should be appreciated that computer readable data may be sent, received, stored, processed, and presented by a variety of components. It should also be appreciated that components illustrated may control other components, whether illustrated herein or otherwise.

Ones of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components and included, in one or more embodiments, voltages in memory circuits, configuration of switching circuits, and/or by selective use of particular logic gate circuits.

Additionally, or alternative, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessor may be integrated into a single processing appliance (e.g., computer, server, blade, etc.) or located entirely or in part in a discrete component connected via a communications link (e.g., bus, network, backplane, etc. or a plurality thereof). Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM1926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for improving the visual presentation of a user during a video conference. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

For example, in one alternative embodiment, a video-enabled communication device, comprising:
 a camera;
 a microphone;
 a processor; and
 a computer readable medium comprising instructions that cause the processor to:
 during a communication session including audio and/or video, detect whether the camera is activated and transmitting a video portion;
 in response to detecting the camera is activated and transmitting the video portion, process the video portion to determine a user's position in a frame of the camera;
 in response to detecting the user's position within the frame of the camera should be adjusted, transfer an alert to the user.

Aspects of the embodiment include detecting a state of illumination.

Aspects of the embodiment include detecting the state of illumination should be increased or decreased.

Aspects of the embodiment include detecting the user is too far away from the camera.

Aspects of the embodiment include detecting the user is too close the camera.

Aspects of the embodiment include transferring at least one of: a visual alert or audio alert to the user.

Aspects of the embodiment wherein the user comprises a contact center agent, and transferring an alert to the user comprises transferring the alert to a supervisor of the contact center agent.

Aspects of the embodiment include detecting a face and/or shoulders of the user.

In another alternative embodiment, a method to optimize a visual presentation of a user during a video conferencing session, the method, comprising:
 determining, during the video conferencing session including audio and/or video, whether an image capturing device is activated and transmitting a video portion;
 in response to detecting the imaging device is activated and transmitting the video portion, processing the video portion to determine the user's position in the image;
 in response to detecting the user's position in the image should be adjusted, transferring an alert to the user.

In another alternative embodiment a non-transitory computer-readable medium comprising processor-executable instructions, the processor-executable instructions comprising:
 during a communication session including audio and/or video, instructions configured to detect whether the camera is activated and transmitting a video portion;
 in response to detecting the camera is activated and transmitting the video portion, instructions configured to process the video portion to determine a user's position in a frame of the camera;
 in response to detecting the user's position within the frame of the camera should be adjusted, instructions configured to transfer an alert to the user.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein, and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A video-enabled communication device, comprising:
a camera;
a microphone;
a processor; and
a computer-readable medium comprising instructions that cause the processor to:
during a communication session including audio and/or video, detect whether the camera is activated and transmitting a video portion;
in response to detecting that the camera is activated and transmitting the video portion, process the video portion to determine a position of a user in a frame of the camera; and
in response to detecting that the position of the user within the frame of the camera should be adjusted, transfer an alert to the video-enabled communication device and automatically make one or more adjustments to the camera to correct the position of the user, wherein a video analysis and an audio analysis are performed to determine a confidence level for a determination that the position of the user within the frame of the camera should be adjusted, and wherein a frequency for determining the position of the user in the frame is based on user input.

2. The video-enabled communication device of claim 1, wherein processing the video portion to determine the position of the user in the frame of the camera comprises detecting a state of illumination.

3. The video-enabled communication device of claim 2, wherein the state of illumination should be increased.

4. The video-enabled communication device of claim 2, wherein the state of illumination should be decreased.

5. The video-enabled communication device of claim 1, wherein processing the video portion to determine the position of the user in the frame of the camera comprises detecting the user is too far away from the camera.

6. The video-enabled communication device of claim 1, wherein processing the video portion to determine the position of the user in the frame of the camera comprises detecting the user is too close the camera.

7. The video-enabled communication device of claim 1, wherein transferring the alert to the video-enabled communication device comprises transferring a visual alert.

8. The video-enabled communication device of claim 1, wherein transferring the alert to the video-enabled communication device comprises transferring an audio alert.

9. The video-enabled communication device of claim 1, wherein the user comprises a contact center agent, and wherein an alert is also transferred to a supervisor of the contact center agent.

10. The video-enabled communication device of claim 1, wherein processing the video portion to determine the position of the user in the frame of the camera comprises detecting a face and/or shoulders of the user.

11. A method to optimize a visual presentation of a user during a video conferencing session, the method comprising:
  determining, via a processor, during the video conferencing session including audio and/or video, whether an image capturing device is activated and transmitting a video portion;
  in response to detecting that the image capturing device is activated and transmitting the video portion, processing, via the processor, the video portion to determine a position of the user in the image; and
  in response to detecting that the position of the user in the image should be adjusted, transferring an alert to the image capturing device and automatically sending, via the processor, instructions to make one or more adjustments to the image capturing device to correct the position of the user, wherein a video analysis and an audio analysis are performed to determine a confidence level for a determination that the position of the user within a frame of a camera should be adjusted, and wherein a frequency for determining the position of the user in the frame is based on user input.

12. The method of claim 11, wherein processing the video portion to determine the position of the user in the image comprises detecting a state of illumination.

13. The method of claim 12, wherein the state of illumination should be increased.

14. The method of claim 12, wherein the state of illumination should be decreased.

15. The method of claim 11, wherein processing the video portion to determine the position of the user in the image comprises detecting the user is too far away from the image capturing device.

16. The method of claim 11, wherein processing the video portion to determine the position of the user in the image comprises detecting the user is too close the image capturing device.

17. The method of claim 11, wherein transferring the alert to the image capturing device comprises transferring a visual alert.

18. The method of claim 11, wherein transferring the alert to the image capturing device comprises transferring an audio alert.

19. The method of claim 11, wherein the user comprises a contact center agent, and wherein an alert is also transferred to a supervisor of the contact center agent.

20. A non-transitory computer-readable medium comprising processor-executable instructions, the processor-executable instructions comprising:
  during a communication session including audio and/or video, instructions configured to detect whether a camera is activated and transmitting a video portion;
  in response to detecting that the camera is activated and transmitting the video portion, instructions configured to process the video portion to determine a position of a user in a frame of the camera; and
  in response to detecting that the position of the user within the frame of the camera should be adjusted, instructions configured to transfer an alert to the user and automatically make one or more adjustments to the camera to correct the position of the user, wherein a video analysis and an audio analysis are performed to determine a confidence level for a determination that the position of the user within the frame of the camera should be adjusted, and wherein a frequency for determining the position of the user in the frame is based on user input.

\* \* \* \* \*